(12) United States Patent
Gyotoku

(10) Patent No.: US 7,907,741 B2
(45) Date of Patent: Mar. 15, 2011

(54) RECORDING DEVICE AND ADJUSTMENT METHOD OF RECORDING DEVICE

(75) Inventor: Kaoru Gyotoku, Kanagawa (JP)

(73) Assignee: Sony Corporation (JP)

( * ) Notice: Subject to any disclaimer, the term of this patent is extended or adjusted under 35 U.S.C. 154(b) by 1318 days.

(21) Appl. No.: 11/446,746

(22) Filed: Jun. 5, 2006

(65) Prior Publication Data
US 2007/0147632 A1  Jun. 28, 2007

(30) Foreign Application Priority Data

Jun. 6, 2005 (JP) ................ P2005-164982

(51) Int. Cl.
*H04R 3/00* (2006.01)
(52) U.S. Cl. ......... 381/122; 381/91; 381/107; 348/231.4
(58) Field of Classification Search .............. 381/91, 381/122, 103, 104, 107, 92; 348/231.4
See application file for complete search history.

(56) References Cited

U.S. PATENT DOCUMENTS

| | | | | |
|---|---|---|---|---|
| 4,807,051 | A | * | 2/1989 | Ogura ................. 386/107 |
| 5,303,304 | A | * | 4/1994 | Lee .................... 381/26 |
| 6,151,067 | A | | 11/2000 | Suemoto et al. |
| 6,483,532 | B1 | * | 11/2002 | Girod ................ 348/14.12 |
| 6,757,397 | B1 | * | 6/2004 | Buecher et al. .......... 381/122 |
| 2003/0016834 | A1 | * | 1/2003 | Blanco et al. ............ 381/91 |
| 2003/0151678 | A1 | * | 8/2003 | Lee et al. ............. 348/231.4 |

FOREIGN PATENT DOCUMENTS

| | | |
|---|---|---|
| JP | 6-2092699 A | 4/1987 |
| JP | 02-185196 | 7/1990 |
| JP | 06-133387 | 5/1994 |
| JP | 6-292293 | 10/1994 |
| JP | 8-328704 A | 12/1996 |
| JP | 2001-105465 A | 4/2001 |
| JP | 2001-292116 A | 10/2001 |
| JP | 2002-099297 A | 4/2002 |
| JP | 2002-312796 A | 10/2002 |
| JP | 2004-222131 | 8/2004 |
| JP | 2004-347998 A | 12/2004 |
| JP | 2005-070171 A | 3/2005 |

* cited by examiner

*Primary Examiner* — Vivian Chin
*Assistant Examiner* — Jason R Kurr
(74) *Attorney, Agent, or Firm* — Lerner, David, Littenberg, Krumholz & Mentlik, LLP

(57) ABSTRACT

A recording device obtains audio signals by plural microphones and records the audio signals on a recording medium. The device includes plural incorporated microphones for obtaining the audio signals; correction circuits for changing characteristics by correction parameters for the incorporated microphones, for correcting characteristics of the audio signals obtained by the incorporated microphones to a reference characteristic, and for outputting the corrected audio signals; and a recording device for recording the corrected audio signals output from the circuits on the recording medium. When an audio signal obtained by an external microphone is input to the correction circuits and recorded on the recording medium instead of all the audio signals or a part of the audio signals obtained by the plural incorporated microphones, the characteristic of a corresponding correction circuit is set by a correction parameter for the external microphone, the parameter is obtained from the external microphone, the audio signal obtained by the external microphone is corrected to the reference characteristic to produce a different corrected audio signal, and the different corrected audio signal is output.

5 Claims, 9 Drawing Sheets

FIG.6

| RESISTANCE RATIO r/R | AD input (REFERENCE VOLTAGE RATIO) | AD output(HEX) | | RESISTANCE VALUE r (R=100kΩ) | AMPLIFICATION FACTOR |
|---|---|---|---|---|---|
| | | 8bit | 12bit | | |
| 0.00000 | 0 | 00 | 000 | 0 Ω | 0.00 dB |
| 0.00392 | 0.00390625 | 01 | 010 | 392 Ω | 0.02 dB |
| 0.00787 | 0.0078125 | 02 | 020 | 787 Ω | 0.04 dB |
| 0.01186 | 0.01171875 | 03 | 030 | 1.19 kΩ | 0.06 dB |
| 0.01587 | 0.015625 | 04 | 040 | 1.59 kΩ | 0.08 dB |
| 0.01992 | 0.01953125 | 05 | 050 | 1.99 kΩ | 0.10 dB |
| 0.02400 | 0.0234375 | 06 | 060 | 2.40 kΩ | 0.12 dB |
| 0.02811 | 0.02734375 | 07 | 070 | 2.81 kΩ | 0.14 dB |
| 0.03226 | 0.03125 | 08 | 080 | 3.23 kΩ | 0.16 dB |
| 0.03644 | 0.03515625 | 09 | 090 | 3.64 kΩ | 0.18 dB |
| 0.04065 | 0.0390625 | 0A | 0A0 | 4.07 kΩ | 0.20 dB |
| 0.04490 | 0.04296875 | 0B | 0B0 | 4.49 kΩ | 0.22 dB |
| 0.04918 | 0.046875 | 0C | 0C0 | 4.92 kΩ | 0.23 dB |
| 0.05350 | 0.05078125 | 0D | 0D0 | 5.35 kΩ | 0.25 dB |
| 0.05785 | 0.0546875 | 0E | 0E0 | 5.79 kΩ | 0.27 dB |
| 0.06224 | 0.05859375 | 0F | 0F0 | 6.22 kΩ | 0.29 dB |
| 0.06667 | 0.0625 | 10 | 100 | 6.67 kΩ | 0.31 dB |
| : | : | : | : | : | : |
| 0.14286 | 0.125 | 20 | 200 | 14.29 kΩ | 0.61 dB |
| : | : | : | : | : | : |
| 0.23077 | 0.1875 | 30 | 300 | 23.08 kΩ | 0.90 dB |
| : | : | : | : | : | : |
| 15.00000 | 0.9375 | F0 | F00 | 1.5000 MΩ | 3.80 dB |
| : | : | : | : | : | : |
| 255.00000 | 0.99609375 | FF | FF0 | 25.50000 MΩ | 3.99 dB |

FIG. 8

| bit 7 parameter 4bit(HEX) | bit 6 SENSITIVITY ADJUSTING VALUE [dB] | bit 5 | bit 4 | bit 3 parameter 3bit(HEX) | bit 2 | bit 1 | bit 0 1bit reserved | bit 3 parameter 4bit(HEX) | bit 2 | bit 1 | bit 0 |
|---|---|---|---|---|---|---|---|---|---|---|---|
| bit 11 | bit 10 | bit 9 | bit 8 | bit 7 | bit 6 LOW-PASS FILTER CUTOFF FREQUENCY [Hz] | bit 5 | bit 4 | | | | |
| 0 | 0 | | | 0 | none | | 0 none | 0 | reserved | | |
| 1 | 0.25 | | | 1 | 29 | | 1 reserved | 1 | none | | |
| 2 | 0.5 | | | 2 | 34 | | | 2 | reserved | | |
| 3 | 0.75 | | | 3 | 40 | | | 3 | reserved | | |
| 4 | 1 | | | 4 | 48 | | | 4 | reserved | | |
| 5 | 1.25 | | | 5 | 57 | | | 5 | reserved | | |
| 6 | 1.5 | | | 6 | 68 | | | 6 | reserved | | |
| 7 | 1.75 | | | 7 | 81 | | | 7 | reserved | | |
| 8 | -2 | | | none: NO EFFECT ON CHARACTERISTICS | | | | 8 | reserved | | |
| 9 | -1.75 | | | | | | | 9 | reserved | | |
| A | -1.5 | | | | | | | A | reserved | | |
| B | -1.25 | | | | | | | B | reserved | | |
| C | -1 | | | | | | | C | reserved | | |
| D | -0.75 | | | | | | | D | reserved | | |
| E | -0.5 | | | | | | | E | reserved | | |
| F | -0.25 | | | | | | | F | reserved | | |

FIG. 9

| bit 7 | bit 6 | bit 5 | bit 4 | bit 3 | bit 2 | bit 1 | bit 0 |
|---|---|---|---|---|---|---|---|
| bit 11 | bit 10 | bit 9 | bit 8 | bit 7 | bit 6 | bit 5 | bit 4 |

| parameter 4bit(HEX) | SENSITIVITY ADJUSTING VALUE [dB] |
|---|---|
| 0 | -2 |
| 1 | -1.75 |
| 2 | -1.5 |
| 3 | -1.25 |
| 4 | -1 |
| 5 | -0.75 |
| 6 | -0.5 |
| 7 | -0.25 |
| 8 | 0 (default) |
| 9 | 0.25 |
| A | 0.5 |
| B | 0.75 |
| C | 1 |
| D | 1.25 |
| E | 1.5 |
| F | 1.75 |

| parameter 3bit(HEX) | LOW-PASS FILTER CUTOFF FREQUENCY [Hz] |
|---|---|
| 0 | none |
| 1 | 29 |
| 2 | 34 |
| 3 | 40 |
| 4 | 48 |
| 5 | 57 |
| 6 | 68 |
| 7 | 81 |

| 1bit reserved | |
|---|---|
| 0 | none |
| 1 | reserved |

| parameter 4bit(HEX) | bit 2 | bit 1 | bit 0 |
|---|---|---|---|
| 0 | reserved | reserved | reserved |
| 1 | none (default) | reserved | reserved |
| 2 | reserved | reserved | reserved |
| 3 | reserved | reserved | reserved |
| 4 | reserved | reserved | reserved |
| 5 | reserved | reserved | reserved |
| 6 | reserved | reserved | reserved |
| 7 | reserved | reserved | reserved |
| 8 | reserved | reserved | reserved |
| 9 | reserved | reserved | reserved |
| A | reserved | reserved | reserved |
| B | reserved | reserved | reserved |
| C | reserved | reserved | reserved |
| D | reserved | reserved | reserved |
| E | reserved | reserved | reserved |
| F | reserved | reserved | reserved |

FIG. 10

| FIRST SYSTEM | | | | SECOND SYSTEM | | |
|---|---|---|---|---|---|---|
| bit 3 | bit 2 | bit 1 | bit 0 | bit 2 | bit 1 | bit 0 |
| parameter 4bit(HEX) | SENSITIVITY ADJUSTING VALUE [dB] | | | parameter 3bit(HEX) | LOW-PASS FILTER CUTOFF FREQUENCY [Hz] | |
| 0 | -2 | | | | | |
| 1 | -1.75 | | | | | |
| 2 | -1.5 | | | | | |
| 3 | -1.25 | | | | | |
| 4 | -1 | | | | | |
| 5 | -0.75 | | | | | |
| 6 | -0.5 | | | | | |
| 7 | -0.25 | | | | | |
| 8 | 0 | | | 0 | none | |
| 9 | 0.25 | | | 1 | 29 | |
| A | 0.5 | | | 2 | 34 | |
| B | 0.75 | | | 3 | 40 | |
| C | 1 | | | 4 | 48 | |
| D | 1.25 | | | 5 | 57 | |
| E | 1.5 | | | 6 | 68 | |
| F | 1.75 | | | 7 | 81 | |

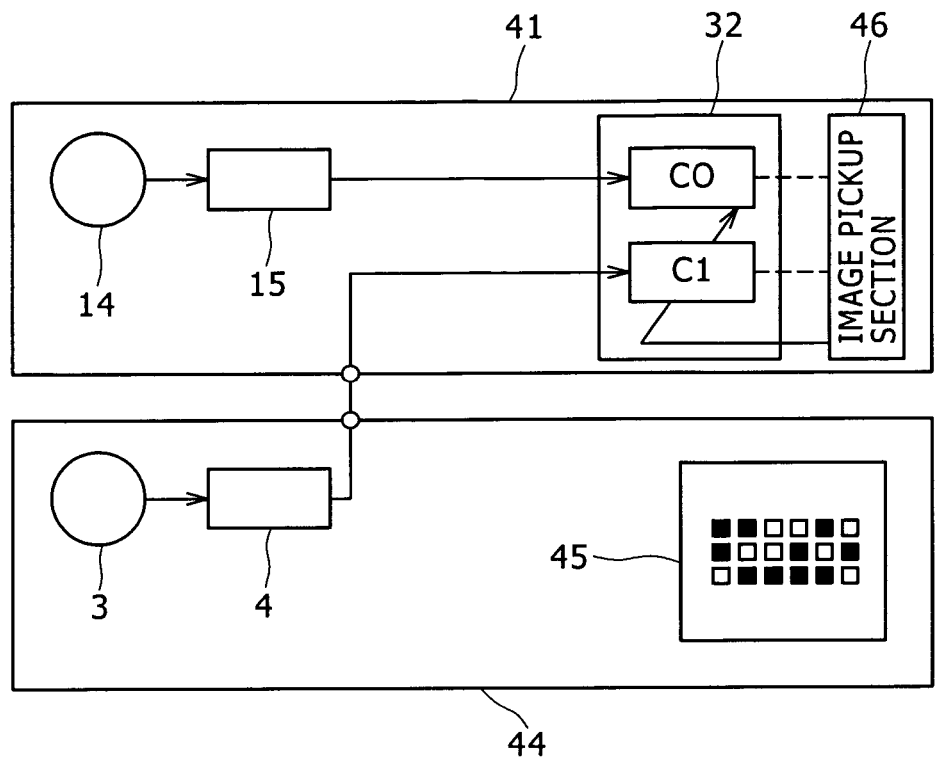
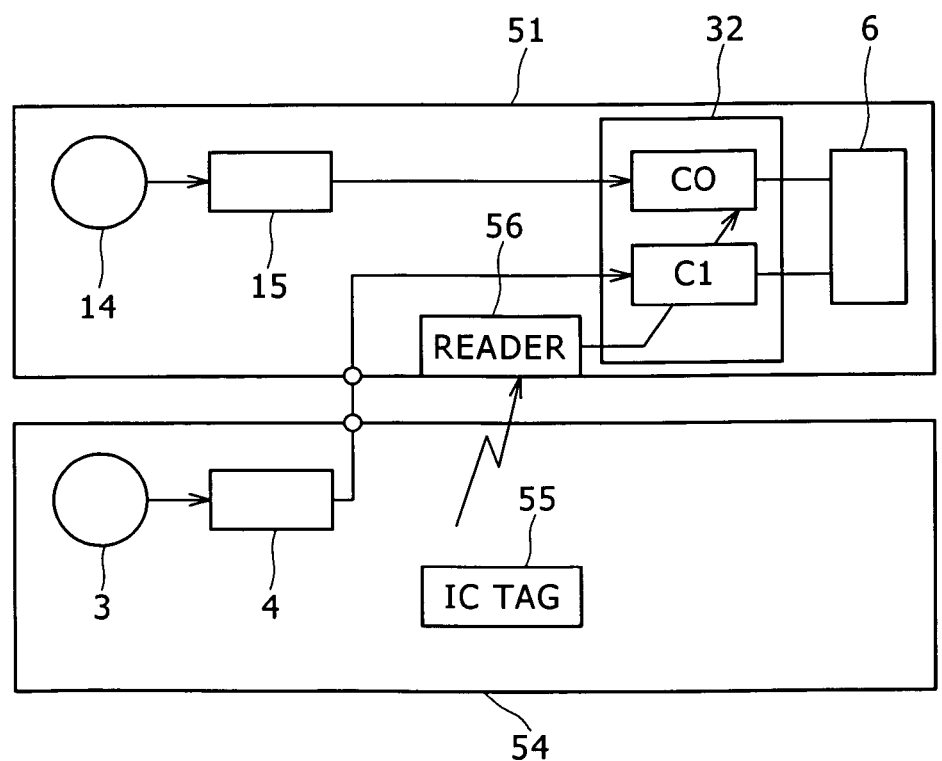

RECORDING DEVICE AND ADJUSTMENT METHOD OF RECORDING DEVICE

CROSS-REFERENCE TO RELATED APPLICATIONS

The present application claims priority from Japanese Patent Application No. JP 2005-164982 filed on Jun. 6, 2005, the disclosure of which is hereby incorporated by reference herein.

BACKGROUND OF THE INVENTION

The present invention relates to a recording device and an adjustment method of the recording device, and is applicable to a portable type video camera that records a result of image pickup on an optical disk, for example. When an audio signal obtained by an external microphone is to be recorded, the present invention sets the characteristic of a corresponding correction circuit on the basis of a correction parameter for the external microphone which parameter is obtained from the external microphone, so that even in the recording using the external microphone, the audio signal can be simply and surely obtained and recorded with a desired sound collecting characteristic.

Of conventional, portable type video cameras that record a result of image pickup and an audio signal on an optical disk, video cameras that record audio signals obtained by an incorporated microphone as a 5.1 multichannel audio signal on an optical disk are provided.

Of such video cameras, there are video cameras that obtain audio signals from various directions by a plurality of microphones and generate a 5.1-channel audio signal by arithmetic operation processing on these audio signals. The characteristic of each microphone and the characteristic of a signal processing circuit for processing an audio signal from each microphone are adjusted at a time of shipment from a factory. Thereby the sound collecting characteristic of the audio signal obtained from each microphone is set to a reference sound collecting characteristic to create a highly realistic 5.1-channel sound field. The sound collecting characteristic is various characteristics of the audio signal that affect the creation of such a multichannel sound field, the various characteristics including directivity, frequency, sensitivity and the like.

In adjustment at a time of shipment from a factory, characteristics necessary for correction are obtained in advance from the sound collecting characteristic of an audio signal output from a microphone, and a correction parameter is set in a correction circuit provided to a signal processing circuit or the correction parameter is set in a program for circuit adjustment in order to secure the characteristics necessary for correction. Thus this kind of video camera sets the sound collecting characteristic of an audio signal from each microphone to a reference sound collecting characteristic and thereby corrects variations between microphones, and the like.

Various methods are proposed in Japanese Patent Laid-open No. Hei 6-292293, for example, in relation to such microphone characteristic correction.

There are cases where such a video camera records an audio signal by an external microphone desired by a user in place of an incorporated microphone. However, such an external microphone often has a different characteristic from that of an incorporated microphone. Therefore an audio signal with a desired sound collecting characteristic may not be obtained when the audio signal is simply obtained by an external microphone in place of an incorporated microphone.

It is thus difficult to record an audio signal for creating a highly realistic sound field. Resultingly external microphones that can be used are limited.

One conceivable method for solving this problem is to adjust a video camera according to an external microphone. Specifically, as shown in FIG. 14, with an external microphone 2 connected to a video camera 1, the external microphone 2 and a sound source S are disposed in a predetermined characteristic adjusting position. A reference signal is reproduced by the sound source S, and sound is collected by the external microphone 2. The external microphone 2 includes a microphone unit 3 as a mechanical-to-electrical transducer unit for converting change in sound pressure into an audio signal and a peripheral circuit 4 for performing amplification and the like of the audio signal output from the microphone unit 3. Incidentally, depending on a type of microphone unit 3, a driving circuit for driving the microphone unit 3 is further provided in the peripheral circuit 4. The video camera 1 includes for example a correction circuit 5 for correcting the characteristic of the audio signal output from the external microphone 2 and a signal processing circuit 6 for processing the audio signal whose characteristic is corrected by the correcting circuit 5. In this adjustment, the characteristic C1 of the correcting circuit 5 is set such that the audio signal S1 output from the signal processing circuit 6 has a desired sound collecting characteristic. The correcting circuit 5 includes for example an amplifier circuit for amplifying the audio signal, an analog-to-digital converter circuit for subjecting the audio signal to analog-to-digital conversion and outputting audio data, and a filter circuit for setting the frequency characteristic of the audio data. The signal processing circuit 6 performs processing for, for example, setting the directivity of an audio signal to a desired directivity by arithmetic operation processing between the audio data and audio data obtained from other microphones.

Thus, as shown in FIG. 15, even when the external microphone 2 is used, an audio signal with a desired sound collecting characteristic can be obtained, whereby a highly realistic sound field can be formed.

In this case, however, the adjustment is a troublesome task, and some users may not be able to perform such adjustment work. While a method is conceivable in which such an adjustment mechanism is provided on the external microphone side, there is a similar disadvantage in this case.

SUMMARY OF THE INVENTION

The present invention has been made in view of the above. It is desirable to propose a recording device and an adjustment method of the recording device that make it possible to simply and surely obtain and record an audio signal with a desired sound collecting characteristic even in recording using an external microphone.

According to an embodiment of the present invention, there is provided a recording device for recording audio signals on a recording medium, the recording device including a plurality of incorporated microphones, correction circuits, and a recording unit. The incorporated microphones obtain the audio signals. The correction circuits change characteristics by correction parameters for the incorporated microphones, correct characteristics of the audio signals obtained by the incorporated microphones to a reference characteristic, and output the corrected audio signals. The recording unit records the corrected audio signals output from the correction circuits on the recording medium. When an audio signal obtained by an external microphone is input to the correction circuits and recorded on the recording medium in place of all the audio signals or a part of the audio signals obtained by the plurality of incorporated microphones, the characteristic of a corresponding correction circuit is set by a correction parameter for the external microphone. The correction parameter is obtained from the external microphone, the audio signal obtained by the external microphone is corrected to the reference characteristic to produce a different corrected audio signal, and the different corrected audio signal is output.

According to another embodiment of the present invention, there is provided an adjustment method of a recording device for recording audio signals on a recording medium, the adjustment method including changing characteristics by correction parameters for incorporated microphones, and correcting characteristics of audio signals obtained by the incorporated microphones to a reference characteristic; inputting an audio signal from an external microphone in place of all the audio signals or a part of the audio signals obtained by the plurality of incorporated microphones; setting a corresponding correction characteristic by a correction parameter for the external microphone, the correction parameter being obtained from the external microphone, and correcting the audio signal input from the external microphone to the reference characteristic to produce a corrected audio signal; and recording the corrected audio signal onto the recording medium.

According to the above-described embodiment of the present invention, a recording device for recording audio signals on a recording medium includes the plurality of incorporated microphones, the correction circuits, and the recording unit. The incorporated microphones obtain the audio signals. The correction circuits change characteristics by correction parameters for the incorporated microphones, correct characteristics of the audio signals obtained by the incorporated microphones to a reference characteristic, and output the corrected audio signals. The recording unit records the corrected audio signals output from the correction circuits on the recording medium. When an audio signal obtained by an external microphone is input to the correction circuits and recorded on the recording medium in place of all the audio signals or a part of the audio signals obtained by the plurality of incorporated microphones, the characteristic of a corresponding correction circuit is set by a correction parameter for the external microphone. The correction parameter is obtained from the external microphone, the audio signal obtained by the external microphone is corrected to the reference characteristic, and the corrected audio signal is output. Then, even with the audio signal obtained by the external microphone, it is possible to set the characteristic of the audio signal to the reference characteristic and record the audio signal. In addition, the setting of the characteristic of the audio signal to the reference characteristic can be performed simply and surely. Thus, even in the recording using the external microphone, it is possible to simply and surely obtain and record an audio signal with a desired sound collecting characteristic.

In addition, according to the other embodiment of the present invention, it is possible to provide an adjustment method of a recording device that can simply and surely obtain and record an audio signal with a desired sound collecting characteristic even in recording using an external microphone.

According to an embodiment of the present invention, it is possible to simply and surely obtain and record an audio signal with a desired sound collecting characteristic even in recording using an external microphone.

BRIEF DESCRIPTION OF THE DRAWINGS

FIG. 6 is a table of assistance in explaining correction parameters for the video camera in FIG. 4;

FIG. 8 is a table of assistance in explaining correction parameters for the video camera in FIG. 4;

FIG. 9 is a table of assistance in explaining another example of the correction parameters of FIG. 8;

FIG. 10 is a table of assistance in explaining another example of the correction parameters of FIG. 8;

FIG. 11 is a block diagram showing a video camera according to a third embodiment of the present invention;

FIG. 12 is a block diagram showing a video camera according to a fourth embodiment of the present invention;

DETAILED DESCRIPTION

Figure 1:
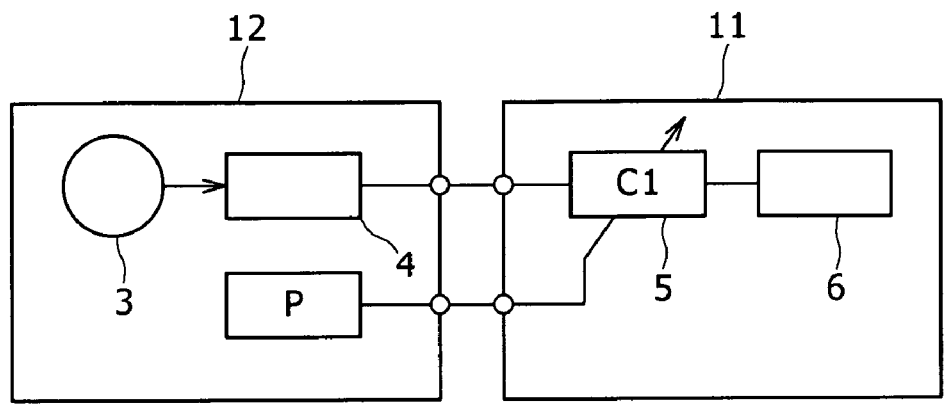
FIG. 1 is a block diagram of a video camera used to explain principles and configurations of the present invention.

Preferred embodiments of the present invention will hereinafter be described in detail referring to the drawings accordingly.

(1) Configuration of Embodiment

FIG. 1 is a block diagram of a video camera used to explain principles and configurations of the present invention. This video camera 11 is connected to an external microphone 12, and sets the characteristic of a correcting circuit 5 on the basis of a correction parameter P provided in the external microphone 12.

Figure 2:
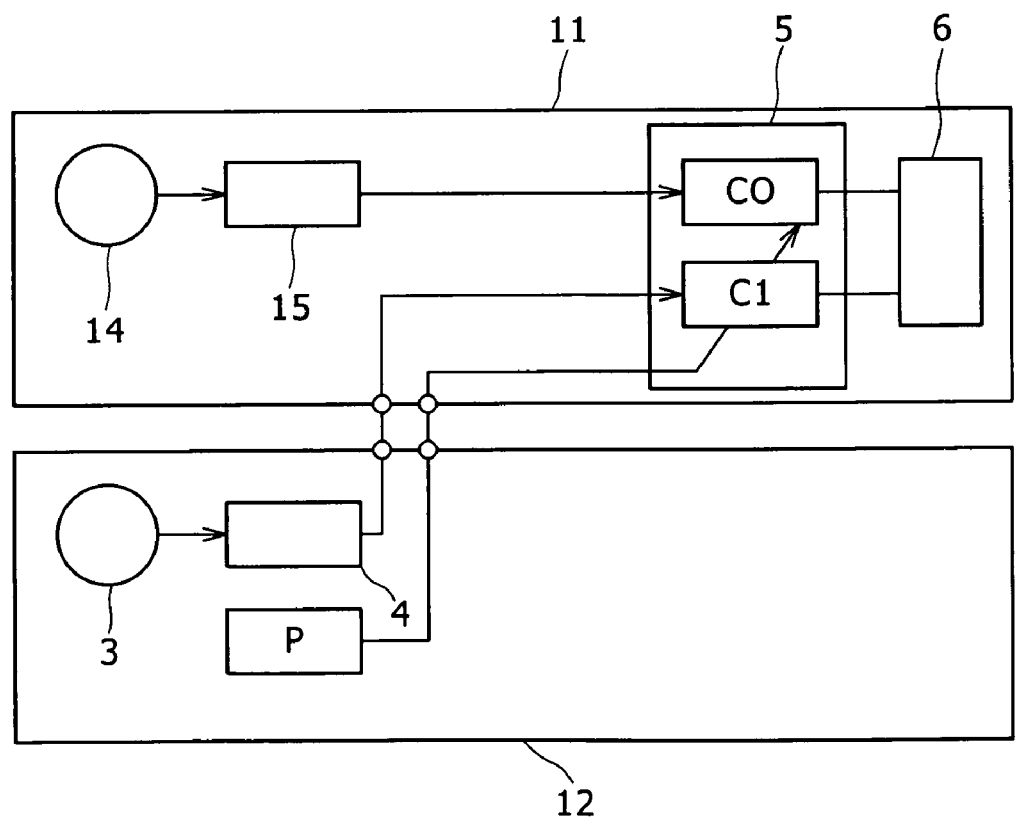
FIG. 2 is a block diagram showing an external microphone being connected to the video camera in FIG. 1.

Thus, as shown in FIG. 2, when the video camera 11 uses an incorporated microphone, an audio signal obtained by the incorporated microphone 14 provided to the video camera 11 is processed by a peripheral circuit 15 for the incorporated microphone. Thereafter the characteristic of the audio signal is corrected by the correcting circuit 5 on the basis of a characteristic C0 for the incorporated microphone, to be set to a reference sound collecting characteristic. The audio signal is then processed by a processing circuit 6. On the other hand, when the external microphone 12 is connected to the video camera 11, the characteristic of the correcting circuit 5 is changed to a characteristic C1 based on the correction parameter P. An audio signal obtained by the external microphone 12 is corrected by this characteristic to be set to the reference sound collecting characteristic, and then processed by the processing circuit 6.

Figure 3:
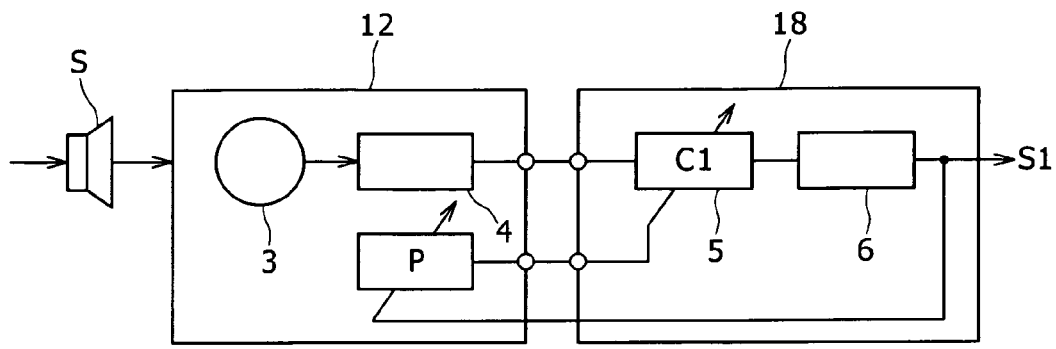
FIG. 3 is a block diagram of assistance in explaining a correction parameter for the external microphone in FIG. 2.
Figure 14:
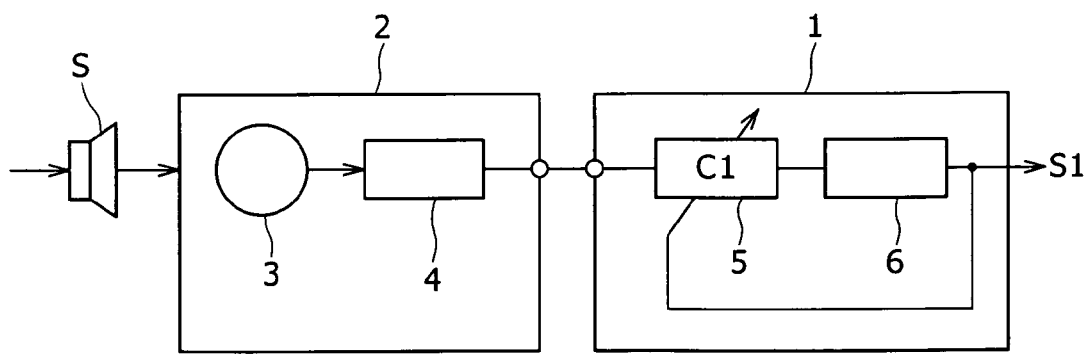
FIG. 14 is a block diagram of assistance in explaining an adjustment for an external microphone.
Figure 15:
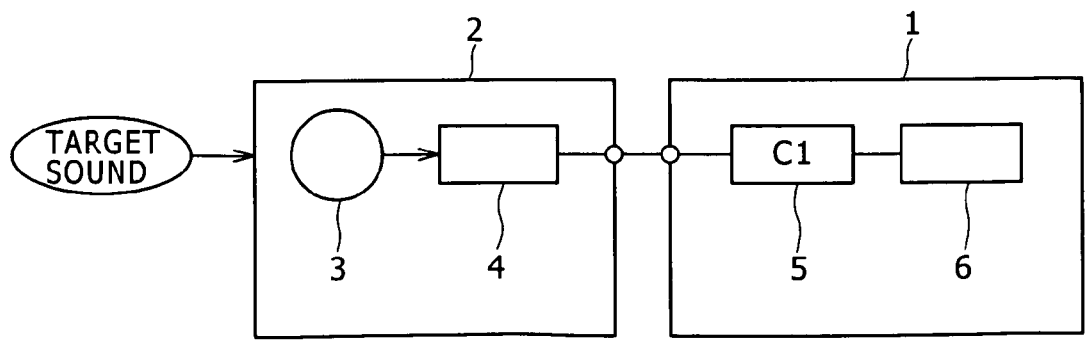
FIG. 15 is a block diagram of assistance in explaining an audio signal as a result of the adjustment of FIG. 14.

As shown in FIG. 3 in contrast to FIG. 14, in adjustment work at a time of shipment from a factory, the external microphone 12 is connected to a test device 18 for characteristic adjustment, and outputs an audio signal of a reference signal from a sound source S to the test device 18. The test device 18 in this case is provided with a correcting circuit 5 and a processing circuit 6 set to standard settings in the video camera 11. In this adjustment work, the characteristic C1 of the correcting circuit 5 is adjusted such that an audio signal S1 output from the processing circuit 6 has the reference sound collecting characteristic. The correction parameter P for setting the characteristic of the correcting circuit 5 to the characteristic C1 is set in the external microphone 12.

Figure 4:
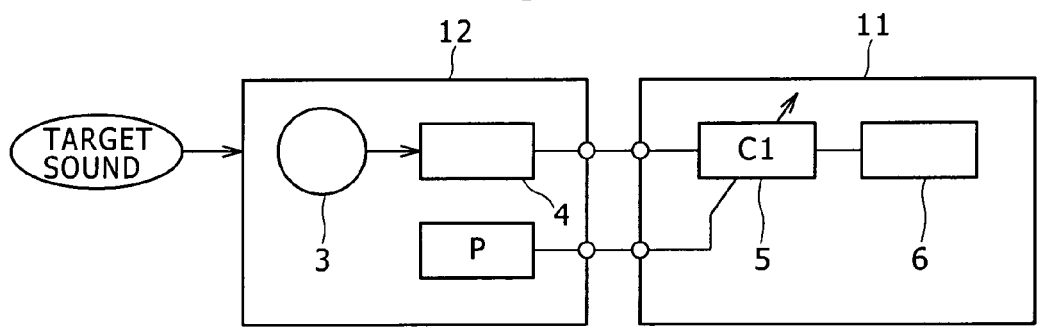
FIG. 4 is a block diagram of assistance in explaining the correction of the characteristic of an audio signal by the correction parameter in FIG. 3.

Thereby, as shown in FIG. 4, the video camera 11 can obtain an audio signal by the external microphone 12 with a sound collecting characteristic similar to that of an audio signal obtained by the incorporated microphone, and process the audio signal. The video camera 11 thus records the audio signal that can form a highly realistic sound field.

Figure 5:
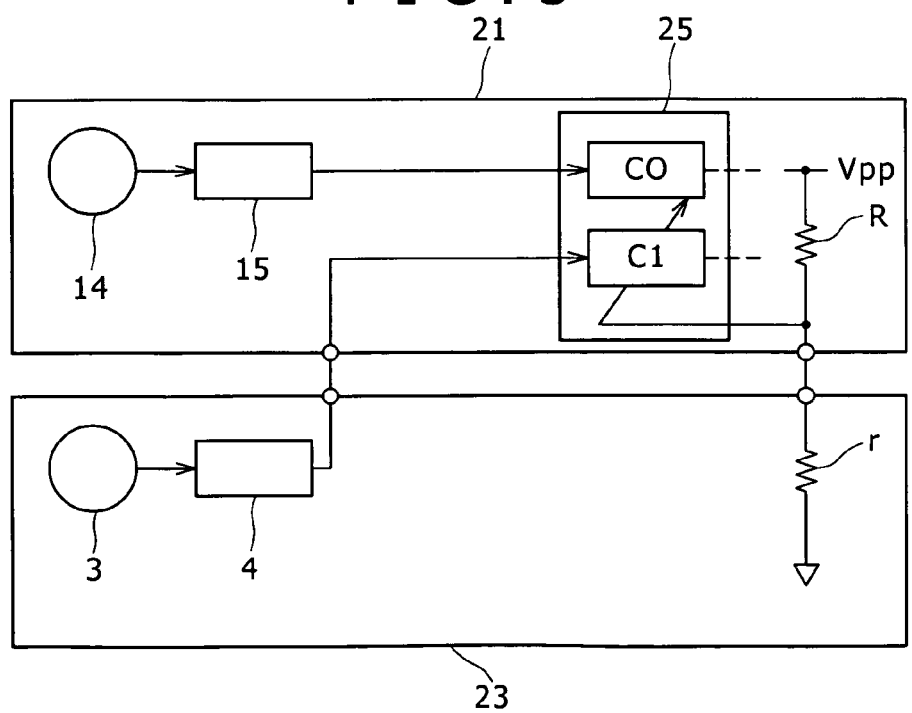
FIG. 5 is a block diagram showing a video camera according to a first embodiment of the present invention.

FIG. 5 is a block diagram showing a concrete configuration of a video camera according to the first embodiment. This video, camera 21 obtains a correction parameter P for this incorporated microphone by a voltage value.

Specifically, a correction circuit 25 in the video camera 21 corrects the sensitivity of an audio signal by an amplifier, and then outputs the audio signal to a processing circuit 6. This amplifier is a variable gain amplifier of a direct-current voltage-controlled type. The amplifier changes an amplification factor thereof according to the value of a sensitivity adjusting voltage generated by resistance voltage division by a resistance series circuit, whereby the sensitivity of the audio signal is adjusted. Alternatively, when the amplifier within the correction circuit 25 is a variable gain amplifier digitally controlled by a register setting rather than a variable gain amplifier of the direct-current voltage-controlled type, a microcomputer not shown in the figure subjects the value of a sensitivity adjusting voltage generated by resistance voltage division by a resistance series circuit to analog-to-digital conversion. The microcomputer, in the same manner writes a parameter value for giving a corresponding gain from the digitized sensitivity adjusting voltage data to a register.

The sensitivity adjusting voltage input to one terminal of the resistance series circuit for the correction circuit 25 is generated by resistance voltage division by a reference resistance R connected to a reference voltage Vpp and a sensitivity adjusting resistance r connected to the reference resistance R. Thus, as shown in FIG. 6, the sensitivity can be adjusted by a setting of the sensitivity adjusting resistance R. Incidentally, a result of analog-to-digital conversion processing (AD output) in FIG. 6 is a result of eight-bit and 12-bit analog-to-digital conversion processing when a predetermined reference voltage is input to an analog-to-digital converter circuit. It is indicated that the sensitivity is increased by raising a ratio of the sensitivity adjusting resistance r to the reference resistance R.

The correction circuit 25 changes the sensitivity adjusting resistance r for processing of an audio signal obtained by an incorporated microphone 14 or for processing of an audio signal obtained by an external microphone 23. When an audio signal obtained by the incorporated microphone 14 is processed, a sensitivity adjusting resistance r corresponding to the sensitivity of the incorporated microphone 14 is connected to the reference resistance R. Thereby the sensitivity of the audio signal obtained by the incorporated microphone 14 is adjusted to a desired reference sensitivity, and then the audio signal is output to the processing circuit 6. On the other hand, when an audio signal obtained by the external microphone 23 is processed, the external microphone 23 is connected, whereby a sensitivity adjusting resistance r provided in the external microphone 23 is connected to the reference resistance R in place of the sensitivity adjusting resistance r of the incorporated microphone 14. Thereby the sensitivity of the audio signal obtained by the external microphone 23 is adjusted to the reference sensitivity, and then the audio signal is output to the processing circuit 6. Thus, in the video camera 21, a correction parameter is given to the correction circuit 25 by the sensitivity adjusting voltage determined by the sensitivity adjusting resistance r. In the case where the amplifier within the correction circuit 25 is a variable gain amplifier digitally controlled by a register setting, a value obtained by converting the value of the sensitivity adjusting voltage for the incorporated microphone 14 into digital data is stored in a memory or the like, and the resistance series circuit is used as a dedicated circuit for generating the sensitivity adjusting voltage for the external microphone 23. It is thus possible to implement the changing of sensitivity adjusting data by a program. In this case, the hardware of a changing circuit can be omitted.

The video camera 21 is provided with a plurality of such configurations from the incorporated microphone 14 to the processing circuit 6. Thereby the sensitivity of microphones is corrected, and audio signals from various directions are obtained by incorporated microphones 14 and/or external microphones 23. Further, a 5.1-channel audio signal is generated by arithmetic operation processing on these audio signals, and a recording unit not shown in the figure records the 5.1-channel audio signal together with a result of image pickup on an optical disk.

(2) Operation of Embodiment

With the above configuration, the video camera 21 according to the first embodiment obtains audio signals from various directions by a plurality of incorporated microphones 14. The audio signals are each processed by the peripheral circuit 15, the correction circuit 25, and the processing circuit 6, and then subjected to arithmetic operation processing to generate a 5.1-channel audio signal. This audio signal is recorded on an optical disk together with a result of image pickup.

Processing systems for the incorporated microphones 14 in the video camera 21 adjust the sensitivity of audio signals obtained by the incorporated microphones 14 by a setting of the sensitivity adjusting resistance r for generating the sensitivity adjusting voltage used to control the gain of the variable gain amplifier, thereby correct the audio signals to the reference sound collecting characteristic, and then convert the audio signals into a 5.1-channel audio signal. Thereby, in the video camera 21, the correction parameter P for setting the characteristic of the correction circuit 25 is provided by the sensitivity adjusting voltage determined by the sensitivity adjusting resistance r, the characteristic of the audio signal obtained by the incorporated microphone 14 is corrected to the reference characteristic, and a 5.1-channel audio signal that can form a highly realistic sound field can be recorded.

In recording such a multichannel audio signal, in particular, a difference in sensitivity between microphones for different directions results in a significant degradation in localization of a sound image, and thereby an unnatural sound field is formed. Thus, the present embodiment corrects the sensitivity of the audio signal obtained by each incorporated microphone 14 to form a highly realistic sound field.

On the other hand, when a part of incorporated microphone units are replaced with external microphones 23 or when all the incorporated microphone units are replaced with external microphones 23, for example, the video camera 21 is connected with the external microphones 23, whereby a sensitivity adjusting resistance r provided in each external microphone 23 is connected to the reference resistance R in place of the sensitivity adjusting resistance r of the incorporated microphone unit 14. Thereby the correction parameter P for setting the characteristic of the correction circuit 25 is provided by the sensitivity adjusting voltage. The video camera 21 thereby changes the characteristic of the correction circuit 25 to correct the characteristic of the audio signal obtained by the external microphone 23 to the reference sound collecting characteristic.

Thereby the video camera 21 corrects the sensitivity of the external microphones 23 with respect to the incorporated microphones 14, further corrects variations in sensitivity between the external microphones 12, and converts the audio signals obtained by the external microphone 23 with a desired sounds collecting characteristic into a 5.1-channel audio signal. Thus, even in recording using the external microphone 23, the video camera 21 can simply and surely obtain an audio signal with a desired sound collecting characteristic. Therefore, also in this case, a highly realistic audio signal can be recorded.

(3) Effect of Embodiment

According to the above configuration, when an audio signal obtained by an external microphone is recorded, the characteristic of a corresponding correction circuit is set by a correction parameter for the external microphone, the correction parameter being obtained from the external microphone. Thus, even in recording using the external microphone, it is possible to simply and surely obtain and record an audio signal with a desired sound collecting characteristic.

Thus external microphones and the like that are not expected at a time of designing the video camera can be flexibly supported to record a highly realistic audio signal. In addition, a procedure for readjusting the correction circuit for such optional parts sold later can be omitted.

Further, by providing the correction parameter by a voltage determined by a sensitivity adjusting resistance, it is possible to adjust the sensitivity of an audio signal obtained by the external microphone with a simple configuration, and thus obtain the audio signal by the external microphone with a desired characteristic.

Figure 7:
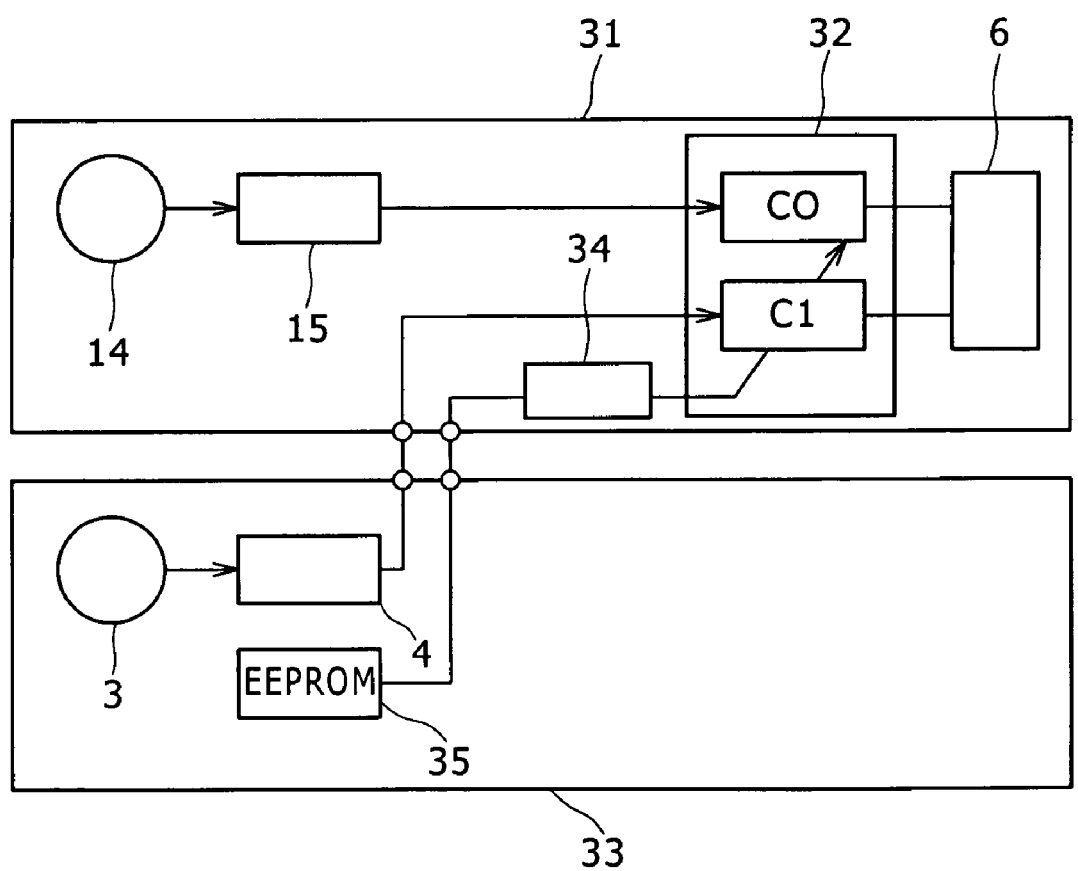
FIG. 7 is a block diagram showing a video camera according to a second embodiment of the present invention.

FIG. 7 is a block diagram showing a video camera according to a second embodiment of the present invention in contrast to FIG. 5. In the video camera 31, same components as in the video camera 21 described above with reference to FIG. 5 are identified by corresponding reference numerals, and repeated description thereof will be omitted.

A correction circuit 32 in the video camera 31 sets the characteristic of an audio signal obtained by a microphone to a reference sound collecting characteristic by correcting the sensitivity and frequency characteristic of the audio signal. The video camera 31 thereby corrects the characteristic of an audio signal obtained from each microphone with an even higher accuracy to create a highly realistic sound field than the above-described video camera 21 according to the first embodiment. In addition, correction parameters used for correction are obtained from an external microphone, and the correction parameters are obtained from a memory provided in the external microphone.

Specifically, when the video camera 31 records an audio signal obtained by an incorporated microphone 14, correction data recorded in a memory is set in a register of the correction circuit 32 by a microcomputer not shown in the figure.

As shown in FIG. 8, the correction data specifies the gain of the correction circuit 32 by upper four bits of eight-bit data, and thereby the sensitivity of an audio signal is set. The correction circuit 32 processes the upper four bits of the data set in the register by converting the data into a parameter for giving a desired gain in a variable gain amplifier digitally controlled by a register setting, and thereby corrects the sensitivity of the audio signal. The correction data also specifies the cutoff frequency of a low-pass filter for correcting the frequency characteristic of the audio signal by three subsequent bits. The correction circuit 32 changes a tap coefficient of the filter circuit for processing the audio data by the data of the three subsequent bits which data is set in the register, and thereby corrects the frequency characteristic of the audio signal. Incidentally, FIG. 8 also illustrates a case where the correction data is generated by 12 bits.

Thus, the video camera 21 records and retains the correction data in a memory for each of incorporated microphones 14, sets the characteristic of an audio signal obtained by each of the incorporated microphones 14 to a reference characteristic, and thereby corrects variations between these incorporated microphones 14.

An external microphone 33 is provided with a rewritable read-only memory 35 such for example as an EEPROM (Electrically Erasable Programmable Read-Only Memory). The correction data is recorded in the memory 35 in an adjustment process at a time of shipment from a factory. In the video camera 31, when a connection of the external microphone 33 is detected, the correction data recorded in the memory 35 is obtained by a controller via an interface 34, and is then set in the correction circuit 32. In the present embodiment, an audio signal with a desired characteristic is obtained by correcting the sensitivity and the frequency characteristic of the audio signal, and the correction parameters for setting the sensitivity and the frequency characteristic of the audio signal are provided by the correction data recorded in the memory. Incidentally, the correction data may be set as shown in FIG. 9 or FIG. 10 in place of FIG. 8.

FIG. 9 represents a case where the correction data is set so as to increase or decrease sensitivity with a substantially mean data value as a reference. FIG. 10 shows correction data in a case where characteristics of correction circuits associated with two specific systems are set by one piece of correction data.

According to the present embodiment, similar effects to those of the first embodiment can be obtained when an audio signal with a desired characteristic is obtained by correcting the sensitivity and the frequency characteristic of the audio signal, and the correction parameters for setting the sensitivity and the frequency characteristic of the audio signal are provided by the correction data recorded in the memory.

FIG. 11 is a block diagram showing a video camera according to a third embodiment of the present invention in contrast to FIG. 7. In the present embodiment, correction data is supplied from an external microphone 44 to a video camera 41 by a two-dimensional bar code such as a QR code or the like. The video camera 41 is formed in the same manner as the above-described video camera 21 or 31 according to the first embodiment or the second embodiment except for a method of supplying the correction data from the external microphone 44.

The external microphone 44 is provided with a two-dimensional bar code 45 on a side surface or the like. When a connection of the external microphone 44 is detected, the video camera 41 displays a menu for specifying the picking up of an image of the two-dimensional bar code 45 on a display screen for monitoring a result of image pickup by control of a controller. After the image of the two-dimensional bar code 45 is picked up by an image pickup section 46, the result of image pickup is subjected to image analysis by the controller to decode the correction data, and then the correction data is set in a correction circuit 32.

As in the present embodiment, effects similar to those of the above-described embodiments can be obtained when the correction data is provided by image data.

FIG. 12 is a block diagram showing a video camera according to a fourth embodiment of the present invention in contrast to FIG. 7. In the present embodiment, correction data is recorded and retained in an external microphone 54 by means of an IC tag 55. Incidentally, the video camera according to the fourth embodiment is formed in the same manner as the above-described video camera 21 or 31 according to the first embodiment or the second embodiment except that the video camera according to the fourth embodiment has a different configuration for correction data because of the IC tag 55.

When detecting a connection of the external microphone 54, a controller controlling the operation of the whole of the video camera 51 controls a reader 56 as a radio communication unit for radio communication with the IC tag 55 to obtain the correction data recorded on the IC tag 55. The controller sets the correction data in a correction circuit 32.

Similar effects to those of the second embodiment can be obtained when the correction data for the external microphone is retained on the IC tag and correction parameters are obtained by data communication between the IC tag and the radio communication unit as in the present embodiment.

Figure 13:
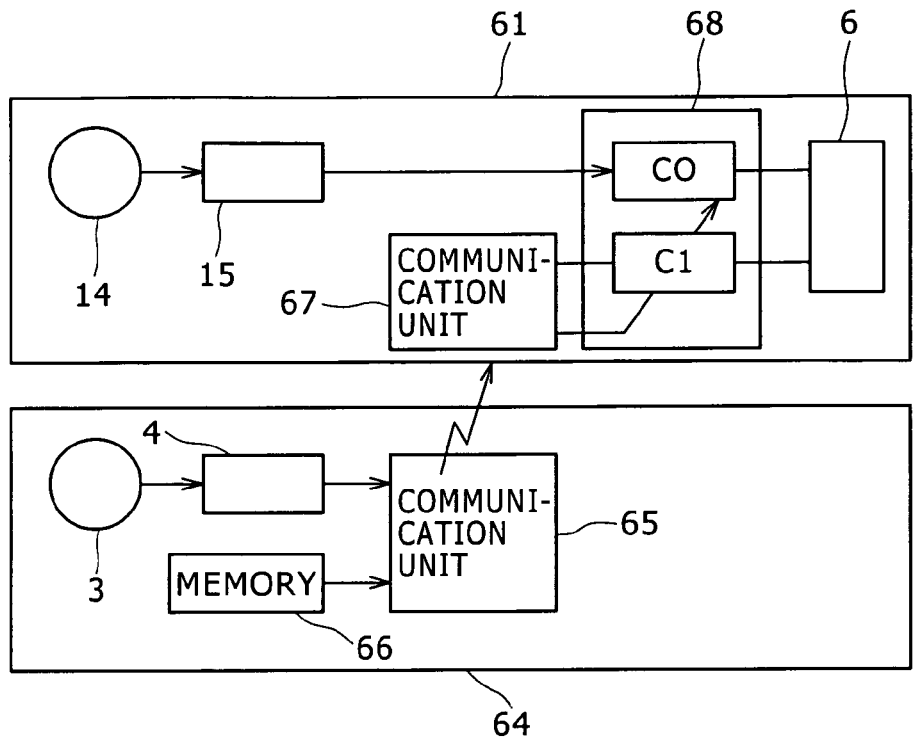
FIG. 13 is a block diagram showing a video camera according to a fifth embodiment of the present invention.

FIG. 13 is a block diagram showing a video camera according to a fifth embodiment of the present invention in contrast to FIG. 7. In the present embodiment, an audio signal of an external microphone 64 is input to a video camera 61 by Bluetooth radio communication, for example, and also correction data for the external microphone 64 is notified to the video camera 61 by this radio communication.

For this, the external microphone 64 is provided with an analog-to-digital converter circuit for subjecting the audio signal obtained by a microphone unit 3 to analog-to-digital conversion processing and then outputting audio data, a memory 66 for recording and retaining the correction data, and a communication unit 65 for transmitting the audio data and the correction data.

The video camera 61 is provided with a communication unit 67 for receiving the audio data and the correction data from the external microphone 64. A correction circuit 68 corrects the sensitivity of the audio signal from the external microphone 64 by multiplication processing by a coefficient corresponding to the correction data.

Similar effects to those of the foregoing embodiments can be obtained when the audio data is supplied to the video camera by the radio communication and the correction data is notified by the radio communication as in the present embodiment.

It is to be noted that while in the foregoing embodiments, description has been made of a case of correcting sensitivity in the first embodiment and a case of correcting sensitivity and frequency characteristics in the second to fourth embodiments, the present invention is not limited to this, and is widely applicable to correction of various characteristics.

In addition, while in the foregoing embodiments, description has been made of a case where audio signals of four channels are obtained and a 5.1-channel audio signal is recorded, the present invention is not limited to this, and is widely applicable to cases where audio signals of various numbers of channels are obtained and cases where an audio signal of various numbers of channels is recorded.

In addition, while in the foregoing embodiments, description has been made of a case where the present invention is applied to a video camera and an audio signal is recorded on an optical disk together with a result of image pickup, the present invention is not limited to this, and is also widely applicable to cases where an audio signal is recorded together with a result of image pickup on various recording media such as memory cards, magnetic disks and the like and cases where an audio signal is recorded on a recording medium.

The present invention relates to a recording device and an adjustment method of the recording device, and is applicable to a portable type video camera that records a result of image pickup on an optical disk, for example.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording device for recording audio signals on a recording medium, the recording device comprising:
    a plurality of incorporated microphones for obtaining the audio signals;
    correction circuits configured to change characteristics by correction parameters for the incorporated microphones, to correct characteristics of the audio signals obtained by the incorporated microphones to a reference characteristic, and to output the corrected audio signals; and
    a recording unit configured to record the corrected audio signals output from the correction circuits on the recording medium;
    wherein when an audio signal obtained by an external microphone is input to the correction circuits and recorded on the recording medium in place of all the audio signals or a part of the audio signals obtained by the plurality of incorporated microphones, the characteristic of a corresponding correction circuit is set by a correction parameter for the external microphone which is usable to correct sensitivity thereof, the correction parameter being obtained from information contained within the external microphone, the audio signal obtained by the external microphone is corrected to the reference characteristic to produce a different corrected audio signal, and the different corrected audio signal is output.

2. The recording device as claimed in claim 1, wherein the correction parameter for the external microphone is stored in a memory provided in the external microphone and wherein the correction circuit obtains the correction parameter for the external microphone from the memory provided in the external microphone.

3. The recording device as claimed in claim 1, further comprising:
    an image pickup unit configured to output a result of image pickup; and
    an image analyzing unit configured to analyze the result of image pickup to detect the correction parameter for the external microphone, the correction parameter being recorded as an image on the external microphone.

4. A recording device for recording audio signals on a recording medium, the recording device comprising:
    a plurality of incorporated microphones for obtaining the audio signals;
    correction circuits configured to change characteristics by correction parameters for the incorporated microphones, to correct characteristics of the audio signals obtained by the incorporated microphones to a reference characteristic, and to output the corrected audio signals; and a recording unit configured to record the corrected audio signals output from the correction circuits on the recording medium;

wherein when an audio signal obtained by an external microphone is input to the correction circuits and recorded on the recording medium in place of all the audio signals or a part of the audio signals obtained by the plurality of incorporated microphones, the characteristic of a corresponding correction circuit is set by a correction parameter for the external microphone, the correction parameter being obtained from the external microphone, the audio signal obtained by the external microphone is corrected to the reference characteristic to produce a different corrected audio signal, and the different corrected audio signal is output, and wherein the correction parameter is recorded in the external microphone, the recording device further comprising:

a radio communication unit configured to obtain the correction parameter for the external microphone by data communication with a radio communication unit provided in the external microphone.

5. An adjustment method of a recording device for recording the audio signals on a recording medium, the adjustment method comprising:

changing characteristics by correction parameters for incorporated microphones, and correcting characteristics of audio signals obtained by the incorporated microphones to a reference characteristic;

inputting an audio signal from an external microphone in place of all the audio signals or a part of the audio signals obtained by the plurality of incorporated microphones;

setting a corresponding correction characteristic by a correction parameter for the external microphone which is usable to correct sensitivity thereof, the correction parameter being obtained from information contained within the external microphone, and correcting the audio signal input from the external microphone to the reference characteristic to produce a corrected audio signal; and recording the corrected audio signal onto the recording medium.

* * * * *